(12) United States Patent
Eckert (10) Patent No.: US 9,838,323 B2
(45) Date of Patent: Dec. 5, 2017

(54) PRIORITY BASED ANYCAST ROUTING

(71) Applicant: Cisco Technology, Inc., San Jose, CA (US)

(72) Inventor: Toerless T. Eckert, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 355 days.

(21) Appl. No.: 14/563,964

(22) Filed: Dec. 8, 2014

(65) Prior Publication Data

US 2015/0095513 A1    Apr. 2, 2015

Related U.S. Application Data

(63) Continuation of application No. 10/649,272, filed on Aug. 27, 2003, now Pat. No. 8,909,726.

(51) Int. Cl.
| | |
|---|---|
| *G06F 15/173* | (2006.01) |
| *H04L 12/851* | (2013.01) |
| *H04L 12/741* | (2013.01) |
| *H04L 29/12* | (2006.01) |
| *H04L 12/931* | (2013.01) |

(52) U.S. Cl.
CPC .......... *H04L 47/2433* (2013.01); *H04L 45/74* (2013.01); *H04L 49/00* (2013.01); *H04L 61/1511* (2013.01); *H04L 61/2069* (2013.01)

(58) Field of Classification Search
CPC .. H04L 45/74; H04L 47/2433; H04L 61/1552
USPC .................................................. 709/207, 240
See application file for complete search history.

(56) References Cited

U.S. PATENT DOCUMENTS

| | | | |
|---|---|---|---|
| 5,148,545 A | 9/1992 | Herbst et al. | |
| 5,793,763 A | 8/1998 | Mayes et al. | |
| 6,185,619 B1 | 2/2001 | Joffe et al. | |
| 6,301,617 B1 | 10/2001 | Carr | |
| 6,333,918 B1 | 12/2001 | Hummel | |
| 6,393,486 B1 | 5/2002 | Pelavin et al. | |
| 6,477,522 B1 | 11/2002 | Young | |
| 6,553,413 B1 * | 4/2003 | Leighton | G06F 17/3089 707/E17.119 |
| 6,667,976 B1 | 12/2003 | Prasanna | |
| 6,687,731 B1 * | 2/2004 | Kavak | H04L 29/06 709/226 |
| 6,708,250 B2 | 3/2004 | Gillingham | |

(Continued)

OTHER PUBLICATIONS

R. Perlman, Interconnections: Bridges and Routers, Addison-Wesley, Reading, MA, (c) 1992, pp. 233-239.

(Continued)

*Primary Examiner* — Kristie Shingles
(74) *Attorney, Agent, or Firm* — Polsinelli PC (57) ABSTRACT

A technique for selecting a network node from a plurality of nodes employing anycast addressing based on a priority. The plurality of nodes is configured with an anycast address. At each node, the anycast address is associated with a unique priority value that represents a priority associated with the node. Traffic destined for the anycast address is forwarded to the node whose priority value indicates the highest priority. If the node becomes unavailable, traffic destined for the anycast address is forwarded to a node whose priority value indicates the next highest priority, and so on.

19 Claims, 5 Drawing Sheets

(56) References Cited

U.S. PATENT DOCUMENTS

| | | | |
|---|---|---|---|
| 6,757,768 | B1 | 6/2004 | Potter et al. |
| 6,785,704 | B1 | 8/2004 | McCanne |
| 6,901,445 | B2 | 5/2005 | McCanne et al. |
| 7,046,687 | B1 | 5/2006 | Brown et al. |
| 7,088,718 | B1 | 8/2006 | Srivastava |
| 7,103,645 | B2 * | 9/2006 | Leighton ............. G06F 17/3089 707/E17.119 |
| 7,142,541 | B2 | 11/2006 | Kumar et al. |
| 7,194,078 | B2 | 3/2007 | Stumer |
| 7,254,636 | B1 | 8/2007 | O'Toole et al. |
| 7,330,906 | B2 | 2/2008 | Hameleers et al. |
| 7,343,422 | B2 | 3/2008 | Garcia-Luna-Aceves et al. |
| 7,373,644 | B2 * | 5/2008 | Aborn ................. H04L 67/1008 709/223 |
| 7,461,147 | B1 | 12/2008 | Mowat et al. |
| 7,510,113 | B2 | 3/2009 | Igarashi et al. |
| 7,552,233 | B2 | 6/2009 | Raju et al. |
| 7,571,206 | B2 | 8/2009 | Koning et al. |
| 7,574,499 | B1 * | 8/2009 | Swildens ................. G06F 9/505 709/202 |
| 7,616,632 | B2 * | 11/2009 | Loa ......................... H04L 45/00 370/252 |
| 7,653,700 | B1 * | 1/2010 | Bahl .................... H04L 12/2602 709/216 |
| 2004/0082312 | A1 | 4/2004 | O'Neill et al. |
| 2004/0107234 | A1 | 6/2004 | Rajahalme |
| 2005/0044141 | A1 | 2/2005 | Hameleers et al. |

OTHER PUBLICATIONS

S. Deering et al., Protocol Independent Multicast-Sparse Mode (PIM-SM): Motivation and Architecture, draft-ietf-idmr-pim-arch-04.ps, Internet Engineering Task Force, http://www.ietf.org, Oct. 24, 1996, pp. 1-16.

Z. Fei et al., A Novel Server Selection Technique for Improving the Response Time of a Replicated Service, Networking and Telecommunications Group, College of Computing, Georgia Institute of Technology, Atlanta, GA, (c) 1997, pp. 1-9.

S. Bhattacharjee et al., Application-Layer Anycasting, College of Computing, Georgia Institute of Technology, Atlanta, GA, (c) 1996, pp. 1-24.

Deploying Bidirectional (Bidir) PIM for Many-to-Many Applications, Cisco Systems Incorporated, http//www.cisco.com, Feb. 2003, pp. 1-10.

B. Fenner et al., Multicast Source Discovery Protocol (MSDP), draft-ietf-msdp-spec-18.txt, Internet Engineering Task Force, http://www.ietf.org, May 2003, pp. 1-25.

D. Kim et al., Anycast RP mechanism using PIM and MSDP, draft-ietf-mboned-anycast-rp-07.txt, Internet Engineering Task Force, http://www.ietf.org, Jul. 2001, pp. 1-8.

C. Partridge et al., Host Anycasting Service, Request for Comments (RFC): 1546, Internet Engineering Task Force, http://www.ietf.org, Nov. 1993, pp. 1-9.

D. Johnson et al., Reserved IPv6 Subnet Anycast Addresses, Request for Comments (RFC): 2526, Internet Engineering Task Force, http://www.ietf.org, Mar. 1999, pp. 1-7.

C. Huitema, An Anycast Prefix for 6to4 Relay Routers, Request for Comments (RFC): 3068, Internet Engineering Task Force, http://www.ietf.org, Jun. 2001, pp. 1-9.

D. Kim et al., Anycast Rendezvous Point (RP) mechanism using Protocol Independent Multicast (PIM) and Multicast Source Discovery Protocol (MSDP), Request for Comments (RFC): 3446, Internet Engineering Task Force, http://www.ietf.org, Jan. 2003.

R. Hinden et al., Internet Protocol Version 6 (IPv6) Addressing Architecture, Request for Comments (RFC): 3513, Internet Engineering Task Force, http://www.ietf.org, Apr. 2003, pp. 1-26.

* cited by examiner

PRIORITY BASED ANYCAST ROUTING

CROSS REFERENCE TO RELATED APPLICATION

This application is a continuation of U.S. patent application Ser. No. 10/649,272, filed Aug. 27, 2003, the content of which is incorporated by reference herein in its entirety.

BACKGROUND OF THE INVENTION

Field of the Invention

The present invention relates to data networking and in particular to prioritizing access to nodes contained in a data network.

Background Information

A data network is a geographically distributed collection of interconnected communication links and segments for transporting data between nodes, such as computers. The nodes typically transport the data over the network by exchanging discrete frames or packets containing the data in accordance with various predefined protocols, such as the Transmission Control Protocol/Internet Protocol (TCP/IP) or the Internetwork Packet eXchange (IPX) protocol.

Many types of networks are available, with types ranging from local area networks (LANs) to wide area networks (WANs). LANs typically connect nodes, such as personal computers and workstations, over dedicated private communications links located in the same general physical location, such as a building or a campus. WANs, on the other hand, typically connect large numbers of geographically dispersed nodes over long-distance communications links, such as common carrier telephone lines. The Internet is an example of a WAN that connects disparate networks throughout the world, providing global communication between nodes contained in various networks.

WANs often comprise a complex network containing many different intermediate network nodes, such as routers or switches. These nodes are interconnected to form the WAN and are often configured to perform various functions associated with forwarding traffic through the WAN. One function typically performed by an intermediate node is implementing a routing protocol, such as the Border Gateway Protocol (BGP) or the Open Shortest-Path First (OSPF) protocol. Routing protocols typically enable the exchange of routing information that may be used by the intermediate nodes to forward (route) traffic carried by the nodes through the data network from a source to a destination.

Some data networks contain nodes, such as server nodes, that are configured to provide various services to nodes, such as client nodes, coupled to the network. In a typical arrangement, a client node accesses a particular service by issuing requests to the server node providing the service. The server node receives the request, processes it, and depending on the nature of the request may respond to the client with results. For example, a network may contain a server that provides a Domain Name System (DNS) service for resolving a fully qualified domain name (FQDN) to an IP address. In a typical arrangement, a client accesses the DNS service by issuing a message (request) to the DNS server wherein the request contains the FQDN that is to be resolved. The DNS server processes the request, which may include searching a database to locate an IP address associated with the FQDN. If an IP address is found, the server sends a response message to the client containing the IP address of the FQDN. Otherwise, if the FQDN cannot be resolved (i.e., no database entries are associated with the FQDN), the server sends a response message indicating the FQDN could not be resolved.

In order to handle a large number of requests for a particular service issued by e.g., a multitude of client nodes, a data network may employ many servers, wherein each server is configured to provide the requested service. In a typical arrangement, an "anycast" address is associated with the service and each server providing the service is configured with the anycast address. As used herein, an anycast address refers to a single address assigned to a plurality of nodes. Servers typically utilize an anycast address to enable access to their particular service, such as a DNS service, a dynamic host control protocol (DHCP) service, or a rendezvous point (RP) associated with a protocol independent multicasting sparse mode (PIM-SM) service. A client typically accesses the service by issuing one or more requests containing the anycast address as a destination address in each request. Intermediate nodes in the network forward the requests to the server configured with the anycast address that is typically located at the shortest path from the requesting client. The server acquires the requests and processes them accordingly, which may include responding to the client.

One advantage with the above described arrangement is that a client node need only know the anycast address associated with the service in order to gain access to the service. Thus, the client node need not be configured with individual addresses for each of the servers providing the service in order to access the service. Another advantage with the above-described arrangement is that it provides for a high degree of availability of the service as "seen" by the clients. For example, if any server that receives the request provides access to the service, if a particular server becomes unavailable, another server providing the same service can "step in" and provide the service in a manner that is transparent to the client. Accordingly, the client sees a high degree of availability with regards to the service and need not take any further action on its part if a particular server becomes unavailable.

One disadvantage associated with the above described arrangement is that if the service involves ensuring that information provided to the clients is coherent among the servers providing the service, special steps may need to be taken to ensure that the information is synchronized among the servers. For example, assume a first server and a second server are configured as described above with an anycast address that is associated with a seat reservation service provided by the servers. Further, assume a first client accesses the service by issuing a request containing the anycast address and that the first server acquires the request and reserves a seat for the client. Now assume a second client accesses the service by issuing a request containing the anycast address and the second server acquires the request. In order to avoid having the second server reserve the same seat for the second client that was reserved for the first client, the second server must know the availability of the seat before it reserves a seat for the second client. One way this can be done is to have the second server synchronize its reservation information with first server before the second server reserves a seat for the second client.

Synchronizing information between servers may involve running a synchronization protocol on the servers that synchronizes the information among the servers. One problem with synchronization protocols is that they may be difficult to configure and may impact the performance of the servers, as the servers must dedicate resources to execute the protocol. Moreover, synchronization may affect client response time for various requests as information may have to be synchronized before a particular request can be completely processed. This, in turn, may act to further impact the server's response time to the client, as well as act to limit the server's capacity to handle requests.

SUMMARY OF THE INVENTION

The present invention relates to a priority based technique for selecting a network node from a plurality of nodes employing anycast addressing. According to the technique, each node in the plurality of nodes is configured with an anycast address and a unique priority value associated with the anycast address that represents a priority associated with the node. Data packets destined for the anycast address are forwarded to a node whose priority value indicates the highest priority. If the node becomes unavailable, data packets destined for the anycast address are forwarded to a node in the plurality of nodes whose priority value indicates the next highest priority, and so on.

In the illustrated embodiment, a network comprising a plurality of servers is configured to support various services that are provided to a plurality of clients coupled to the servers via a network of intermediate nodes. Each service is associated with an anycast address. Moreover, at each server, the anycast address is associated with a unique priority mask value that represents a priority associated with the server. A client accesses a service by issuing a data packet containing a request to access the service wherein the data packet specifies the anycast address associated with the service as a destination address. The request is forwarded via the intermediate nodes to the server configured with the highest priority mask value. Specifically, at each intermediate node, the destination address is applied to a forwarding database to locate one or more entries that contain an address that matches the destination address. If more than one entry is found, the intermediate node examines the priority mask value contained in each matching entry and selects an entry whose priority mask value indicates the highest priority of the matching entries. The intermediate node then forwards the request towards the server associated with the selected entry. When the request reaches the server, the server processes it, which may include issuing a response to the client.

Notably, the inventive technique causes data packets containing a request, wherein the data packet specifies an anycast address as a destination address, to be forwarded to a particular node among a plurality of active nodes configured with the same anycast address. The inventive technique thus obviates having to perform data synchronization that may be necessary if requests could be serviced by any node configured with the anycast address, thereby, reducing the complexity of the network.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
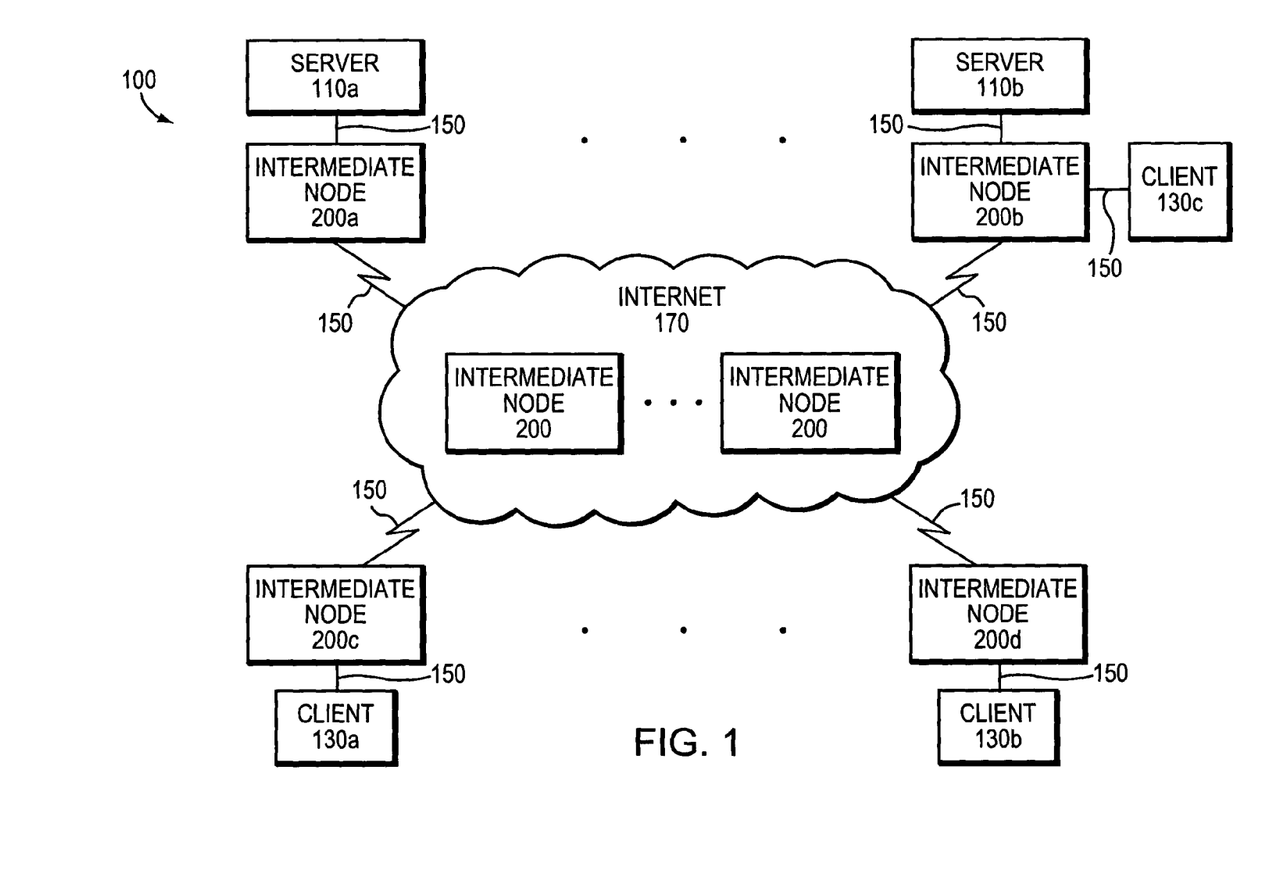
FIG. 1 is a schematic block diagram of an exemplary computer network that may be advantageously used with the present invention.

FIG. 1 is a schematic block diagram of an exemplary computer network 100 that may be advantageously used with the present invention. The computer network 100 comprises a collection of communication links 150 connected to a plurality of nodes, such as servers 110, clients 130, and intermediate nodes 200. The network may comprise wide area networks (WANs), such as Internet 170, interconnected by intermediate nodes 200 to form an internetwork of network nodes. These internetworked nodes communicate by exchanging data packets according to a predefined set of protocols, such as the Transmission Control Protocol/Internet Protocol (TCP/IP).

Figure 2:
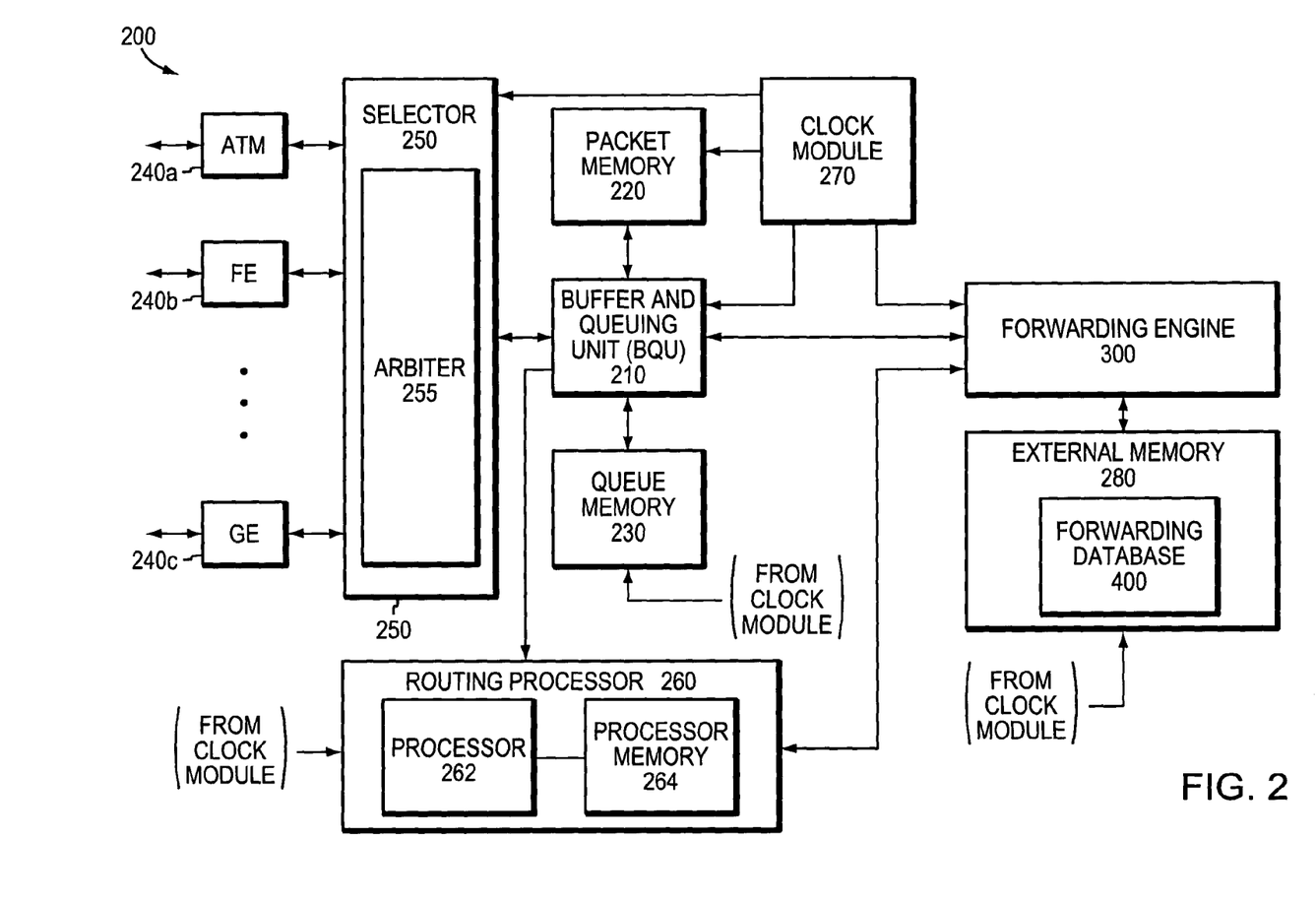
FIG. 2 is a high-level schematic partial block diagram of an intermediate node that may be advantageously used with the present invention.

FIG. 2 is a high-level partial schematic block diagram of intermediate node 200, which illustratively is a switch. An example of a switch that may be advantageously used with the present invention is the Cisco 10000 Series Internet Router available from Cisco Systems Incorporated, San Jose, Calif. Operation of switch 200 will be described with respect to Internet Protocol (IP) routing, although switch 200 may be programmed for other applications, such as encryption.

Switch 200 comprises a plurality of interconnected components including a forwarding engine 300, various memories, queuing logic 210, selector 250, routing processor 260, and network interface cards (line cards) 240. A clock module 270 synchronously controls operations of various components contained in switch 200, although it should be noted that the arrayed elements of the forwarding engine 300 may be operatively configured to function asynchronously. In the illustrative embodiment, the clock module 270 generates clock signals at a frequency of, e.g., 200 megahertz (i.e., 5 nanosecond clock cycles), and globally distributes them via clock lines to the various components of the intermediate node 200.

The memories generally comprise logic and random-access memory (RAM) storage locations addressable by the forwarding engine 300 for storing software programs and data structures accessed by the various components, including software programs and data structures that implement aspects of the inventive technique. An operating system, portions of which are typically resident in memory and executed by the forwarding engine 300, functionally organizes the node 200 by, inter alia, invoking network operations in support of software processes executing on node 200. It will be apparent to those skilled in the art that other memory means, including various computer readable mediums such as disk storage, may be used for storing and executing program instructions pertaining to the inventive technique and mechanism described herein.

A buffer and queuing unit (BQU) 210 is connected to a packet memory 220 for storing packets and a queue memory 230 for storing network-layer and link-layer headers of the packets on data structures, such as linked lists, organized as queues (not shown). The BQU 210 further comprises data interface circuitry for interconnecting the forwarding engine 300 with the line cards 240 via a selector circuit 250 having an arbiter 255. The line cards 240 may comprise, e.g., Asynchronous Transfer Mode (ATM), Fast Ethernet (FE) and Gigabit Ethernet (GE) ports, each of which includes conventional interface circuitry that may incorporate the signal, electrical and mechanical characteristics, and interchange circuits, needed to interface the cards with the physical media and protocols running over that media.

A routing processor 260 comprises a conventional processor 262 coupled to a processor memory 264. Routing processor 260 executes various conventional routing protocols, such as the Open Shortest-Path First (OSPF) protocol, for communication directly with the forwarding engine 300. The routing protocols generally comprise topological information exchanges between intermediate nodes to determine preferred paths through the network based on, e.g., destination IP addresses. These protocols provide information used by the processor 260 to create and maintain various forwarding data-bases, such as forwarding database 400. The databases are loaded into a partitioned external memory 280 and are used by the forwarding engine 300 to perform, e.g., layer-2 (L2) and layer-3 (L3) forwarding operations. When processing a packet's header in accordance with IP routing, for example, the engine 300 determines where to send the packet by indexing into forwarding database 400 using an IP address contained in the header. Execution of the forwarding operations may result in destination media access control (MAC) addresses of the packet's header being rewritten by the forwarding engine 300 to identify an output port associated with the packet.

Figure 3:
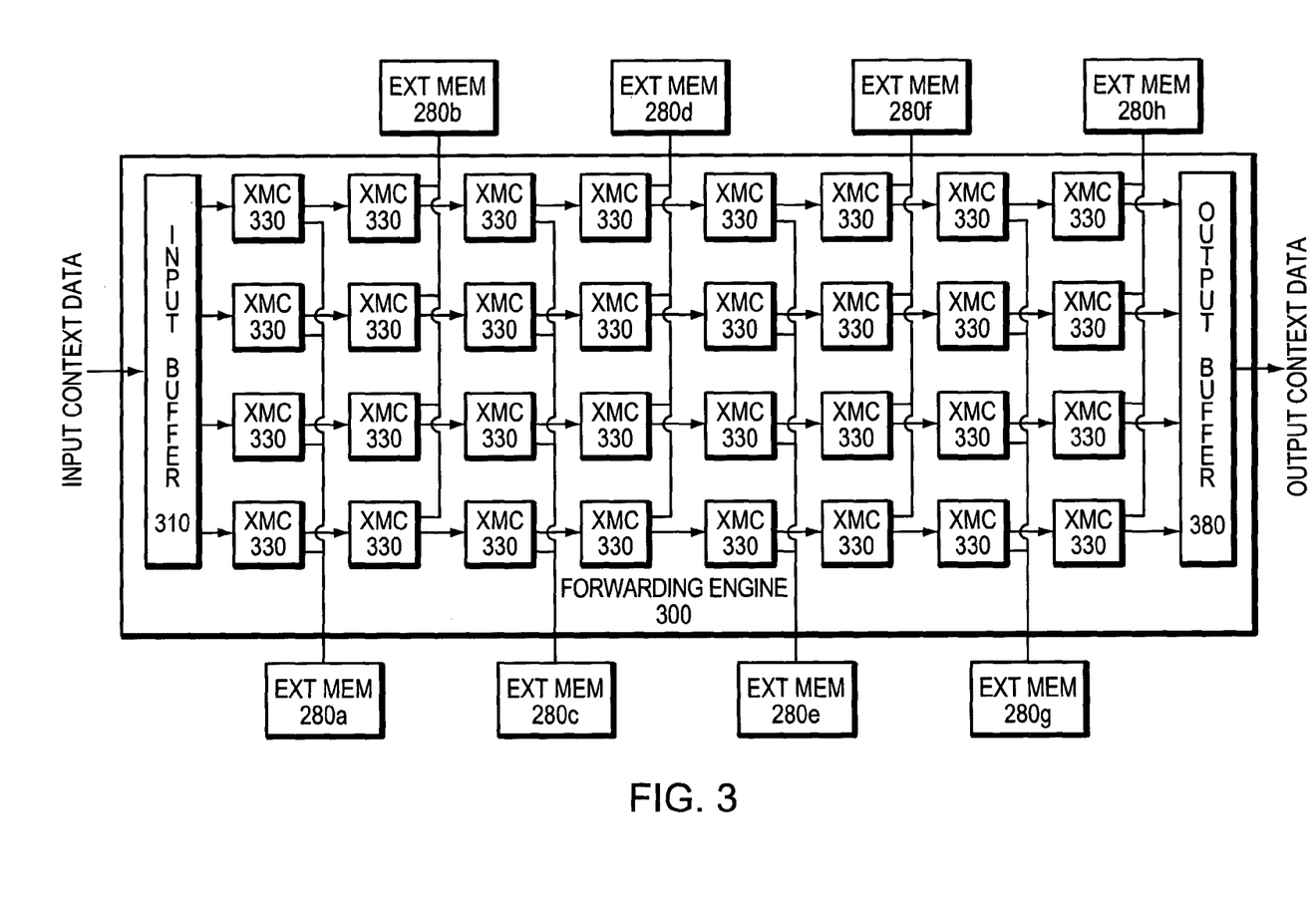
FIG. 3 is a high-level schematic block diagram of a forwarding engine that may be advantageously used with the present invention.

The forwarding engine 300 may comprise a symmetric multiprocessor system having a plurality of processors. FIG. 3 is a high-level schematic block diagram of forwarding engine 300 comprising an array of processing elements (XMCs) 330 embedded between input 310 and output 380 header buffers and coupled to external memory 280. Each processing element 330 illustratively includes a pipelined processor that contains, inter alia, a plurality of arithmetic logic units (ALUs) and a register file having a plurality of general purpose registers that store intermediate result information processed by the ALUs. The processing elements 330 may be arrayed into multiple rows and columns, and further configured as a multi-dimensioned systolic array. Illustratively, the processing elements 330 are arrayed as four (4) rows and eight (8) columns in a 4×8 arrayed configuration that is embedded between an input buffer 310 and an output buffer 380. However, it should be noted that other arrangements, such as an 8×8 arrayed configuration, may be advantageously used with the present invention. The processing elements 330 of each row are configured as stages of a "pipeline" that sequentially execute operations on transient data (e.g., packet headers) loaded by the input buffer 310, whereas the processing elements 330 of each column operate in parallel to perform substantially the same operation on the transient data, but with a shifted phase. Each phase comprises a predetermined period of cycles, e.g., 128 cycles. Sequencing circuitry of the input buffer 310 controls the processing elements 330 of each pipeline by ensuring that each element 330 completes processing of current transient data before loading new transient data into the pipeline at a new phase. In general, a new phase of processing is started, i.e., a context switch is performed, when the elements 330 finish processing their current transient data (current context) and new incoming transient data (new context) is completely received by the input buffer.

Figure 4:
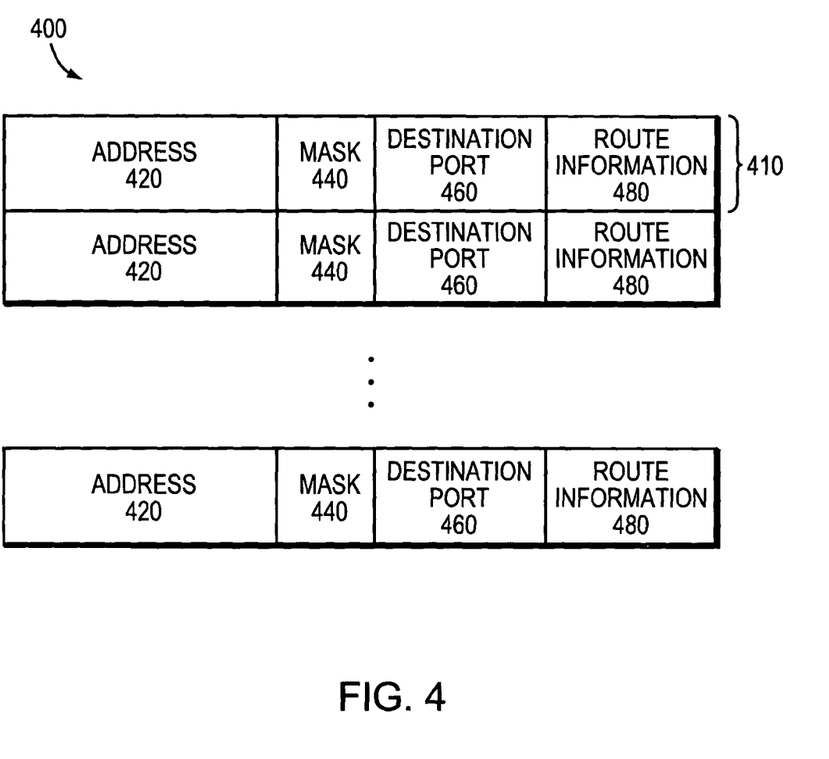
FIG. 4 is a schematic block diagram of a forwarding table that may be advantageously used with the present invention.

The forwarding engine 300 is coupled to a memory 280 partitioned into a plurality of "column" memories 280a-h wherein each column memory is coupled to a particular column of processing elements 330. Memory 280 is preferably organized as one or more banks and is implemented using fast-cycle-random-access-memory (FCRAM) devices, although other devices, such as reduced-latency-dynamic-random-access-memory (RLDRAM) devices, could be used. The external memory 280 stores non-transient data organized as a series of data structures, including forwarding database 400 (FIG. 2) for use in processing the transient data. FIG. 4 is a schematic block diagram of forwarding database 400, which illustratively is organized as a table containing one or more entries 410. It should be noted that although forwarding database 400 is illustratively implemented as a table, database 400 may be implemented in other data structure forms such as a linked-list or an array. Each entry 410 in database 400 is configured to hold information associated with a particular destination node such as server 110a, that is utilized by forwarding engine 300 to, inter alia, make forwarding decisions on data processed by engine 300.

Entry 410 comprises an address field 420, a mask field 440a destination port field 460, and a route information field 480. The address field 420 holds a value, such as an IP address, that represents an address associated with a destination node. The mask field 440 holds a value that represents a priority associated with the destination node. Illustratively, mask field 440 holds a bit-mask value that represents significant bits in the address field 420 that are used by engine 300 when making forwarding decisions to determine a destination node that is to receive data acquired by the intermediate node 200. The destination port field 460 holds a value that represents an output port on the intermediate node 200 where the destination node can be reached. The route information field 480 holds various information associated with the entry 410 which may include next hop information, status information, aging information, and so on.

Operationally, when processing data (e.g., a packet) acquired by the intermediate node 200, engine 300 applies a destination address contained in the acquired data to the forwarding database 400 to locate one or more entries 410 whose address 420 matches the destination address. If more than one entry 410 matches, engine 300 examines the mask 440 of each matching entry 410 and selects an entry 410 whose mask 440 indicates the highest priority, e.g., has the greatest number of asserted (set) bits in the mask 440, of the matching entries 410. Engine 300 then uses information in the selected entry 410 to further process the data which includes, e.g., transferring the data to the line card containing the output port represented in the selected entry's 410 destination port field 460.

The present invention relates to a priority-based technique for selecting a network node from a plurality of nodes employing anycast addressing. According to the technique, each node in the plurality of nodes is configured with an anycast address. Moreover, at each node the anycast address is associated with a unique priority value that represents a priority associated with the node. Traffic destined for the anycast address is forwarded (routed) to the node whose priority value indicates the highest priority. If the node becomes unavailable, traffic destined for the anycast address is forwarded to another node in the plurality of nodes whose priority value indicates the next highest priority, and so on.

Figure 5:
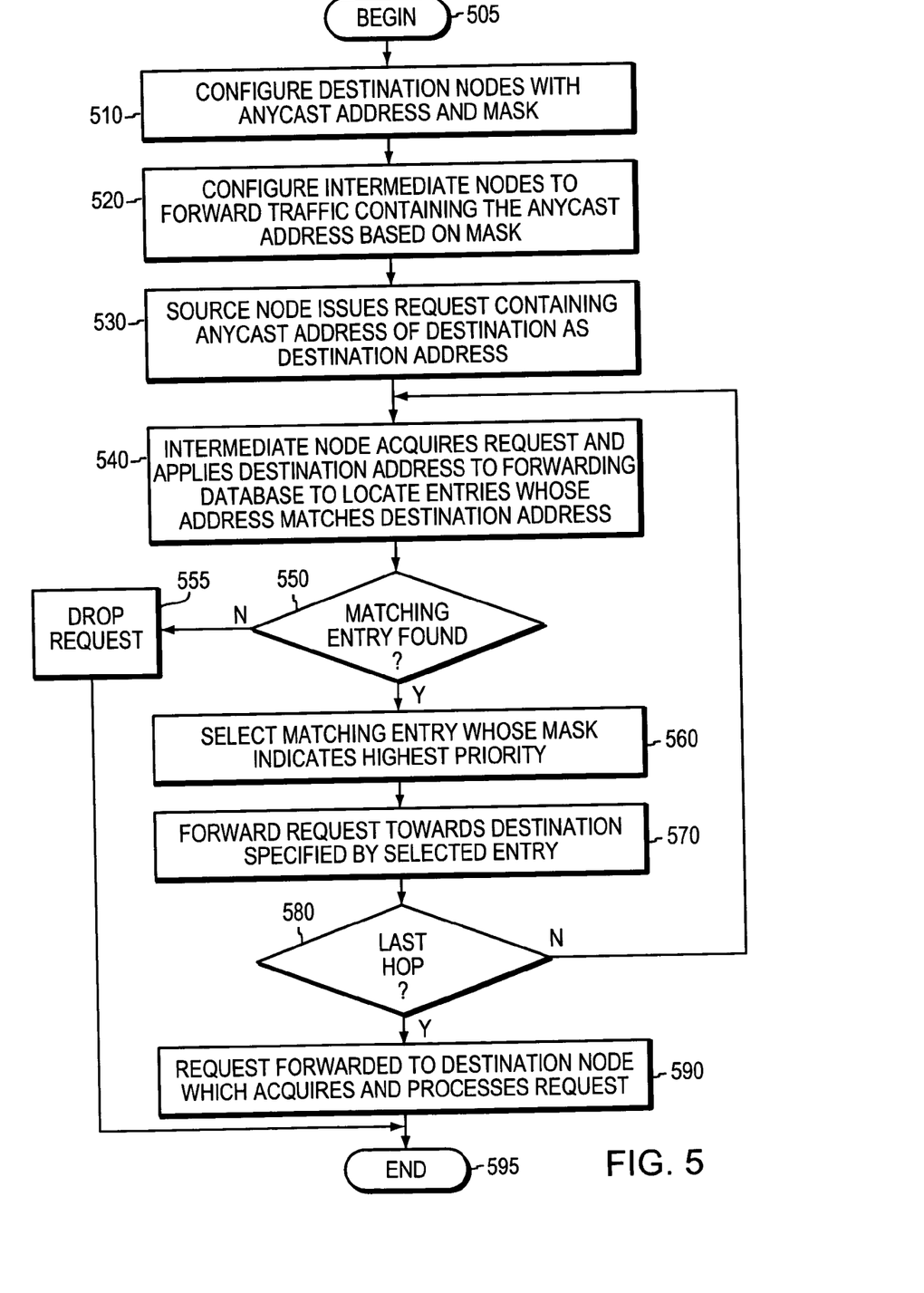
FIG. 5 is a flow diagram of a series of steps that may be used to configure a network and process a request in accordance with the inventive technique.

Referring again to FIG. 1, assume servers 110a and 110b are configured to provide a service associated with an anycast address. A technique that could be used to associate a service with an anycast address is described in "Host Anycasting Service" by C. Partridge et al., Request For Comments (RFC) 1546, available from the Internet Engineering Task Force (IETF), http://www.ietf.org, which is hereby incorporated by reference as though fully set forth herein. Further, assume server 110a is configured with a 32-bit mask value (A/32) which is treated by intermediate nodes 200 as a higher priority mask value than a 31-bit mask value (A/31) configured at server 110b. Notably, configuring server 110a with a higher priority mask than server 110b causes data specifying the anycast address as a destination address to be forwarded by intermediate nodes 200 to server 110a, if server 110a is available, or to server 110b, if server 110a is not available. The intermediate nodes 200 in network 100 exchange the anycast address and bit mask information in accordance with various conventional routing protocols executed by the servers 110a and 110b, and configure their forwarding databases 400 to contain entries 410 that hold the anycast address and mask values for these servers. Now assume client 130c issues a request specifying the anycast address as a destination address in the request. FIG. 5 is a flow diagram of a sequence of steps that may be used to process the request in accordance with the inventive technique. The sequence begins at Step 505 and proceeds to Step 510 where servers 110a and 110b are configured with an anycast address associated with the service and an associated bit mask, as described above. At Step 520, the intermediate nodes 200 in network 100 are configured to forward (route) traffic containing the anycast address based on the mask value associated with the anycast address. Specifically, nodes 200 are configured to execute conventional routing protocols, such as the OSPF, that causes the nodes to exchange routing information, including the anycast address and mask values configured in servers 110, and update their forwarding databases using the exchanged information. Moreover, the intermediate nodes 200 are configured to forward (route) traffic containing an anycast address as a destination address towards a node configured with the highest priority mask associated with the anycast address.

At Step 530, client 130c ("source node") issues a request that specifies the anycast address as a destination address. Intermediate node 200b acquires the request and applies the destination address contained in the request to its forwarding database 400 to locate entries 410 containing an address 420 that matches the destination address (Step 540). Specifically, intermediate node 200b compares the destination address with the contents of the address fields 420 of the entries 410 in the forwarding database 400 and identifies those entries 410 whose address 420 matches the destination address. At Step 550, if no matching entry 410 is found, the sequence proceeds to Step 555 where the request is dropped and Step 595 where the sequence ends.

Otherwise, the sequence proceeds to Step 560 where intermediate node 200b selects a matching entry 410 whose mask field 440 indicates the highest priority of the priority values 440 contained in the matching entries 410. For example, as noted above, the forwarding database 400 in intermediate node 200b contains entries 410 for server 110a and server 110b. Moreover, the address 420 specified in these entries 410 match the destination address specified in the request issued by client 130c. The mask value 420 of the entry 410 associated with server 110a contains a value that indicates the highest priority of the mask values 440 contained in the matching entries 410, i.e., the entries associated with servers 110a and 100b. Thus, at Step 560, intermediate node 200b selects the entry 410 associated with server 110a.

At Step 570, the request is forwarded towards the destination (i.e., server 110a) specified by the selected entry 410. Specifically, intermediate node 200b forwards the request to the line card 240 containing the output port represented by the contents of the selected entry's 410 destination port field 460. At Step 580, if the intermediate node 200 is not the last "hop" in the path from the source node (i.e., client 130c) to the destination node (i.e., server 110a), the sequence returns to Step 540.

When the request reaches the last hop (i.e., intermediate node 200a), rather than returning to Step 540, the sequence proceeds to Step 590 where the request is forwarded to the destination node (i.e., server 110a), which acquires and processes the request. The sequence ends at Step 595.

In the above-described embodiment of the invention, the mask value associated with the anycast address is a bit mask; however, this is not intended to be a limitation of the invention. In other embodiments of the invention, the mask is a data structure, such as an integer.

Also, in the above-described embodiment the destination nodes are servers; however, this too is not intended to be a limitation of the invention. Other types of destination nodes, such as an intermediate node, may take advantage of the inventive technique.

In addition, in the above-described embodiment of the invention, the forwarding engine comprises a systolic array of processing elements (processors); however, this also is not intended to be a limitation of the invention. In other embodiments of the invention, the forwarding engine comprises one or more processors operating independently or cooperatively to process traffic acquired by the intermediate node in a manner consistent with the inventive technique.

It should be further noted that the inventive technique may be applied to data networks utilize rendezvous points (RPs), such as PIM-SM. In these networks, the protocol takes into consideration the priority value associated with the anycast address when forwarding packets. For example, when processing a "PIM-SM register" message in accordance with the inventive technique, a RP that has a priority value that is lower in priority than another RP forwards the register message to an RP whose anycast address is associated with the highest priority. Finally, it should be noted that the inventive technique may operate in data networks configured to utilize multicast reverse path forwarding (RPF) and in networks that utilize bidirection PIM. For example, in a data network containing a primary and a secondary RP wherein both RPs are associated with the same anycast address and the primary RP has a higher priority value than the second RP, a router contained in the network that receives a multicast message forwards the message if it originated from the primary RP (i.e., the RP associated with the higher priority value).

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. In a data network comprising one or more intermediate nodes and one or more destination nodes configured with an anycast address, a method for prioritizing access to a destination node comprising the steps of:

configuring each destination node of the one or more destination node with a unique priority value associated with the anycast address wherein the priority value represents a priority associated with the destination node, the priority value being a bit mask, wherein the one or more intermediate nodes contain a forwarding database comprising one or more forwarding database entries wherein each of the one or more forwarding database entries is associated with a destination node; and forwarding a data packet from a client node specifying the anycast address as a destination address towards a destination node associated with the highest priority value.

2. The method of claim 1, wherein the priority value is an integer.

3. The method of claim 1, wherein the forwarding database is a table.

4. The method of claim 1, wherein each of the one or more forwarding database entries contains an address value and a priority value associated with the destination node.

5. The method of claim 4, further comprising:
acquiring a data packet from the data network wherein the data packet specifies the anycast address as a destination address;
locating one or more matching forwarding database entries using the destination address; and
forwarding the data packet towards a destination node associated with a matching forwarding database entry which contains a priority value that indicates a highest priority of the priority values contained in the one or more matching forwarding database entries.

6. The method of claim 5, further comprising:
comparing the destination address with an address contained in a forwarding database entry; and
if the destination address matches the address contained in the forwarding database entry, determining that the forwarding database entry is a matching entry.

7. The method of claim 5, wherein each forwarding database entry contains a destination port.

8. The method of claim 7, further comprising:
forwarding the data packet out of the destination port specified by the matching forwarding database entry which contains a priority value that indicates the highest priority of the priority values contained in the matching forwarding database entries.

9. An intermediate node comprising:
a network interface configured to acquire from a client node a data packet specifying an anycast address as a destination address;
a forwarding database comprising one or more forwarding database entries wherein each of the one or more forwarding database entries is associated with a destination node and is configured to hold an anycast address and a priority value associated with the destination node, the priority value being a bit mask value; and
a forwarding engine configured to apply the destination address to the forwarding database to locate one or more matching forwarding database entries and forward the data packet towards a destination node associated with the forwarding database entry that contains a priority value that indicates a highest priority of the priority values contained in the one or more matching forwarding database entries.

10. The intermediate node of claim 9, wherein the priority value is an integer.

11. The intermediate node of claim 9 wherein, the forwarding database is a table comprising the one or more forwarding database entries.

12. The intermediate node of claim 11, wherein the forwarding engine is configured to compare the destination address with an address contained in the forwarding database entry and determine that the forwarding database entry is a matching entry.

13. The intermediate node of claim 9, wherein each of the one or more forwarding database entries contains an address field configured to hold an address associated with the destination node and a priority field configured to hold the priority value associated with the destination node.

14. The intermediate node of claim 9, wherein each of the one or more forwarding database entries contains a destination port.

15. The intermediate node of claim 14, wherein the forwarding engine is configured to forward the data packet out of the destination port specified by a matching forwarding database entry which contains a priority value that indicates the highest priority of the priority values contained in the one or more matching forwarding database entries.

16. A system configured to prioritize access to a destination node comprising:
a forwarding database comprising one or more forwarding database entries wherein each of the one or more forwarding database entries is associated with a destination node and is configured to hold an anycast address and a priority value associated with the destination node, the priority value being a bit mask;
means for acquiring a data packet from a client node in a data network wherein the data packet specifies an anycast address as a destination address;
means for locating one or more matching forwarding database entries using the destination address; and
means for forwarding the data packet towards the destination node associated with a matching forwarding database entry that contains a priority value that indicates a highest priority of the priority values contained in the one or more matching forwarding database entries.

17. The system of claim 16, further comprising:
means for comparing the destination address with an address contained in a forwarding database entry; and
means for determining if the forwarding database entry is a matching entry.

18. A non-transitory computer readable medium containing computer executable instructions for execution in a computer processor for:
acquiring a data packet from a data network wherein the data packet specifies an anycast address as a destination address;
locating one or more matching forwarding database entries contained in a forwarding database using the destination address; and
forwarding the data packet towards a destination node associated with a matching forwarding database entry that contains a priority value that indicates the highest priority from of the priority values contained in the one or more matching forwarding database entries, the priority value being a bit mask.

19. The computer readable medium of claim 18, wherein, the forwarding database is a table comprising the one or more matching database entries.

* * * * *